No. 759,856. PATENTED MAY 17, 1904.
G. W. BORTON.
PULVERIZER, BREAKER, OR DISINTEGRATOR.
APPLICATION FILED NOV. 30, 1903.
NO MODEL. 3 SHEETS—SHEET 2.

WITNESSES:
Frank E French

INVENTOR.
George W. Borton
BY Augustus D. Houghton
ATTORNEY.

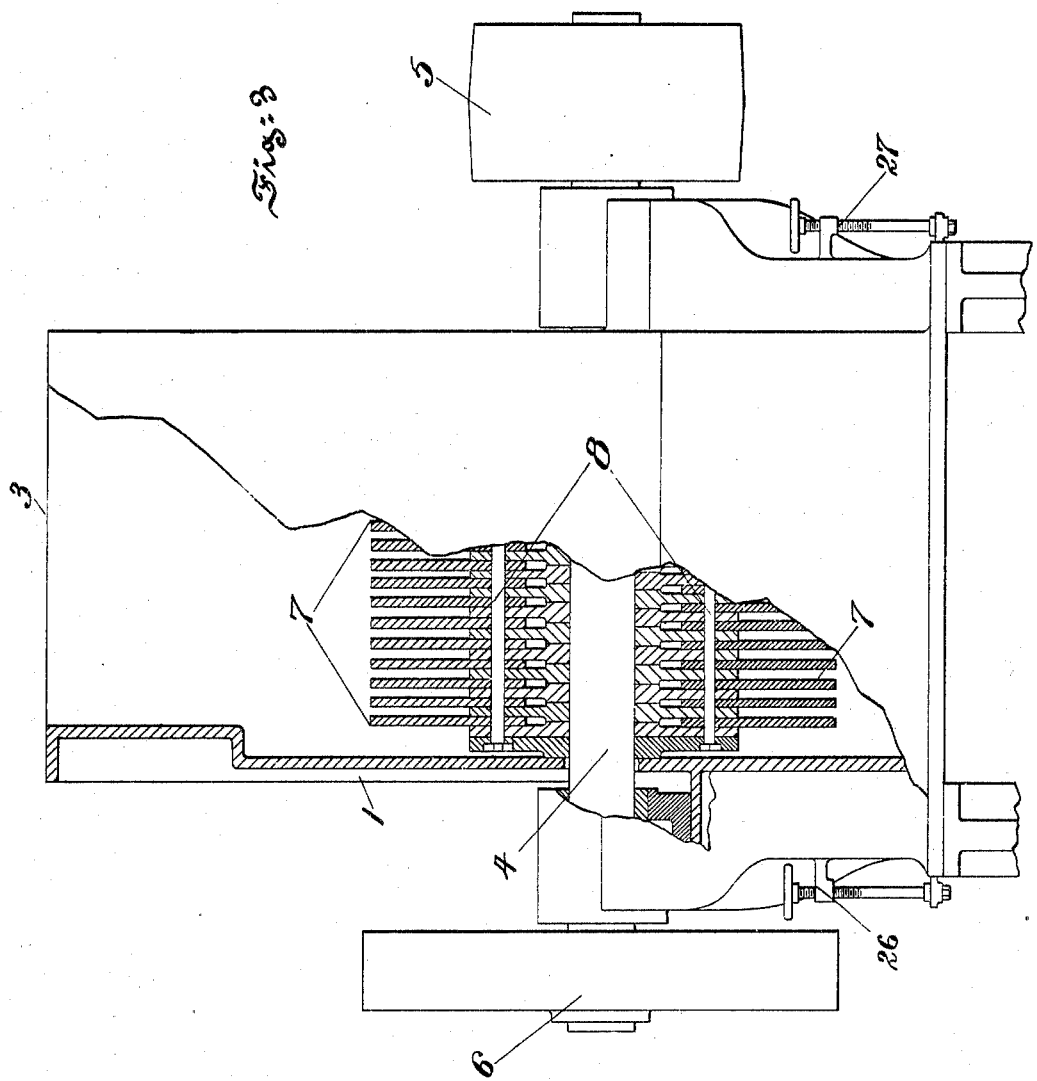

No. 759,856. Patented May 17, 1904.

UNITED STATES PATENT OFFICE.

GEORGE W. BORTON, OF PHILADELPHIA, PENNSYLVANIA.

PULVERIZER, BREAKER, OR DISINTEGRATOR.

SPECIFICATION forming part of Letters Patent No. 759,856, dated May 17, 1904.

Application filed November 30, 1903. Serial No. 183,113. (No model.)

*To all whom it may concern:*

Be it known that I, GEORGE W. BORTON, a citizen of the United States, residing at Philadelphia, in the county of Philadelphia and State of Pennsylvania, have invented certain new and useful Improvements in Pulverizers, Breakers, or Disintegrators, of which the following is a specification.

One object of the present invention is to provide an efficient, durable, and reliable pulverizer, breaker, or disintegrator of comparatively simple construction, and therefore of comparatively inexpensive cost.

Another object of the invention is to provide a screening-surface of comparatively large area, whereby the output of the machine is increased.

Another object of the invention is to provide comparatively inexpensive means whereby the necessary adjustment of the working parts can be made to compensate for wear rapidly and while the parts of the machine are assembled.

To these and other ends hereinafter set forth, the invention comprises the improvements to be presently described and finally claimed.

The nature, characteristic features, and scope of the invention will be more fully understood from the following description, taken in connection with the accompanying drawings, forming part hereof, and in which—

Figure 1:
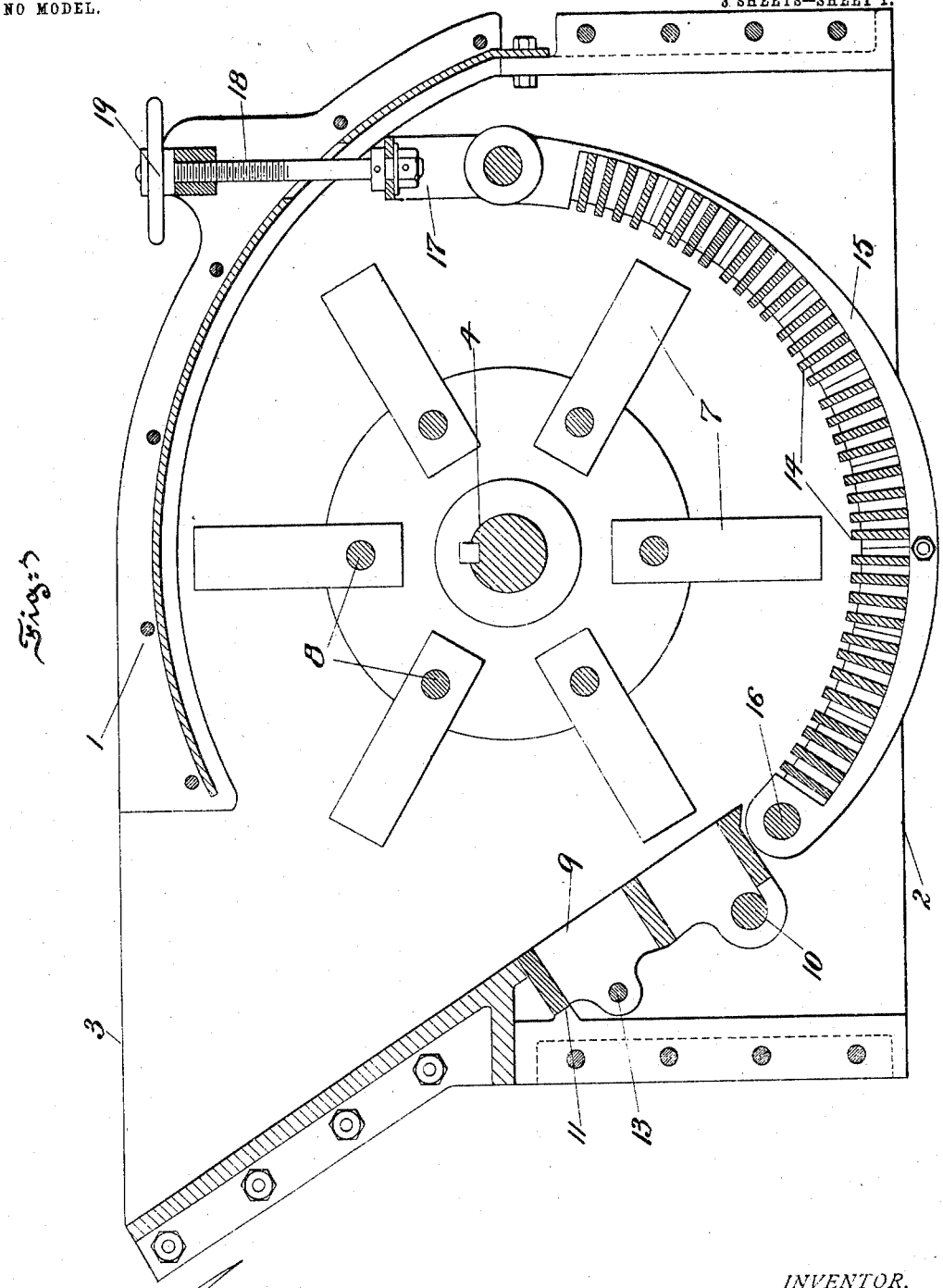
Figure 2:
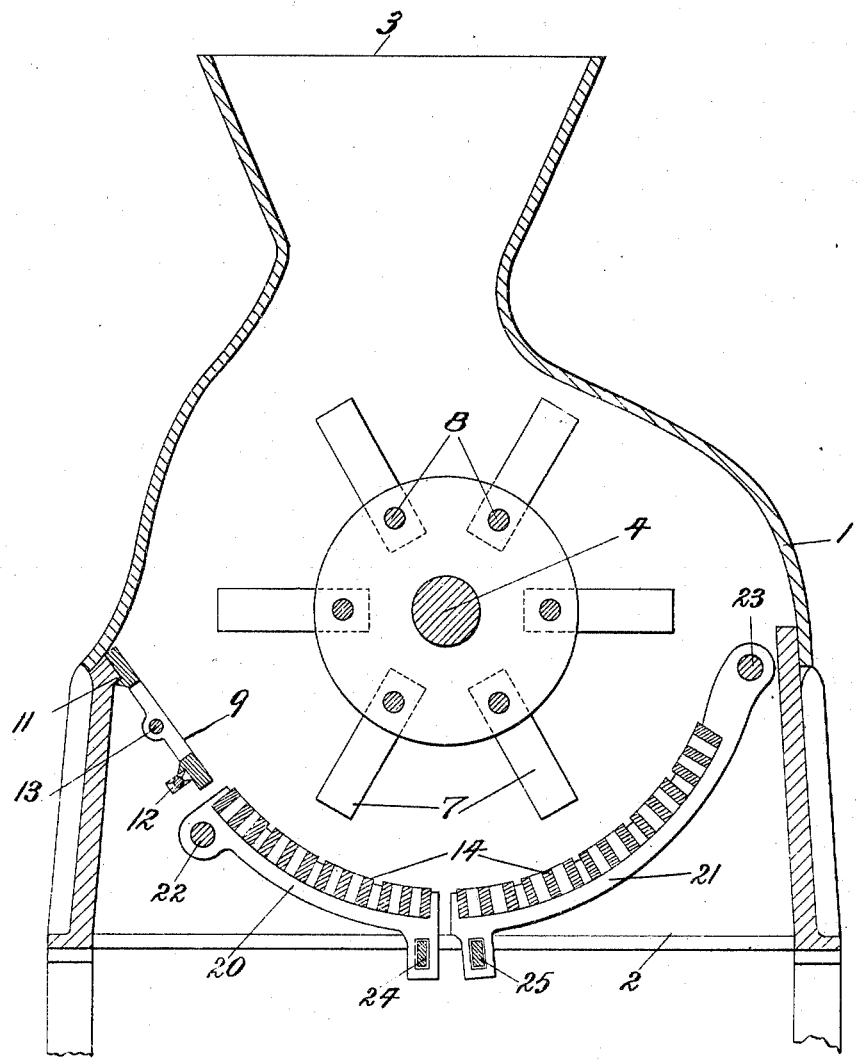

Figure 1 is a side view, principally in section, illustrating a machine embodying features of the invention; and Figs. 2 and 3 are respectively a side and a front view, principally in section, illustrating a machine embodying a modification of the invention.

In the drawings, 1 is a housing or casing provided with side and end walls and open at its base, as at 2, for the delivery of material, and provided at its top with a hopper 3, into which the material is fed. There is a shaft 4 arranged transversely of the casing, and it is supported on suitable bearings at the sides of the machine and provided with a driving-pulley, as 5, and a fly-wheel 6. Keyed to the shaft 4 are a series of disks between which the shanks of hammers 7 are pivoted by means of bolts 8, which penetrate the disks and also the shanks, so that the latter are arranged in straight rows, of which six are shown on the drawings, although the number may be increased or diminished. At the front of the machine there is a grate breaker-plate 9, in which the bars are arranged up and down or longitudinally of the machine. The fact that the breaker-plate 9 is also a grate adds to the screening-surface of the machine, and therefore increases its output. As shown in Fig. 1, this breaker-plate is supported by a transversely-ranging support 10 and by a similarly-ranging flange 11, and, as shown in Fig. 2, it is supported by the transversely-ranging flange 11 and a similarly-arranged support 12 and is detachably held to place in both instances by a tie-piece 13. The grate shown in Fig. 1 is somewhat thicker at its lower portion, so as to provide for wear, and the grate shown in Fig. 2 is capable of being turned and reapplied, so as to compensate for wear, which is greatest at its lower portion. At each side of the machine are pivoted segments which are notched or otherwise arranged to support the ends of transversely-ranging bars 14, which may be made in sets like grate-bars and be arranged detachably, so that they can be readily replaced when worn. As shown in Fig. 2, the bars of the grate are arranged in groups of three, and in Fig. 1 they are arranged in groups of four; but the number is not material. The segments and their grate-bars constitute a cage, and the bars themselves constitute screens.

In Fig. 1 there are two segments 15, one at each side of the machine, and they are pivoted, as at 16. Their free ends are connected by means of a yoke 17, to which is swiveled an adjusting-screw 18, provided with an operating hand-wheel 19, so that upon turning the hand-wheel 19 the segments 15 and with them the grate-bars 14 are turned about the axis 16, and thus adjusted in respect to the ends of the beaters or hammers. As shown in Figs. 2 and 3, there are four segments 20 and 21, whereof two are at each side of the machine, and they are pivoted at their outer ends to suitable pivots 22 and 23. At their inner ends they are connected with bars 24 and 25, which extend across and outside of the machine, and are there provided with adjusting-screws 26 and 27, so that by turning these adjusting-screws the segments and grate-bars are turned about the points 22 and 23, and thus their inner or free ends are adjusted in respect to the beaters or hammers.

It will be obvious to those skilled in the art to which the invention relates that modifications may be made in details without departing from the spirit thereof. Hence I do not limit myself to the precise mode of procedure or constructions hereinabove set forth; but, Having described the nature and objects, what I claim as new, and desire to secure by Letters Patent, is—

1. The combination of a housing, a rotatable shaft provided with pivotal hammers, a concave cage pivoted at one end and clear of the housing at the other end, and adjustable means consisting of a rigid support for the free end of the cage, whereby the cage can be adjusted toward the hammers to compensate for wear upon both the cage and the hammer ends, substantially as described.

2. The combination of a housing, segments pivoted at one of their ends to the opposite walls of the housing and having their other ends free from the housing, screens carried by said segments, a shaft having pivotal hammers, and adjustable means consisting of a rigid support for the free end of the segments, substantially as described.

3. In combination a housing, segments pivoted at one of their ends to the inside of the opposite walls of the housing and having their other ends clear of the housing, screens carried by the segments, a yoke engaging the free ends of the segments, and a hand-wheel arranged on the outside of the housing and having positive screw-and-thread connection with the yoke, substantially as described.

4. The combination of a shaft provided with pivotal hammers, a grate breaker-plate having its bars and spaces arranged parallel with the line of travel of the hammers, and a concave cage, substantially as described.

5. A machine of the class described comprising a housing, a revoluble shaft provided with pivoted hammers, a grate breaker-plate having its bars arranged longitudinally, a sectional cage or screen having longitudinal bars and having its sections pivoted at one of their ends, and means for firmly holding and adjusting the free ends of the sections, substantially as described.

6. A machine of the class specified comprising a housing, a revoluble shaft provided with pivotal hammers, a concave cage pivoted at one end and free of the housing at the other end, a grate breaker-plate, and adjustable means consisting of a rigid support for the free end of the cage, whereby the latter may be adjusted toward the hammer ends independently of the grate breaker-plate, substantially as described.

7. In a machine of the class specified a housing provided with supports, a flat grate breaker-plate fitted with bars and spaces and detachably fitted to said supports, and means for securing and releasing said plate to permit of its being turned to compensate for wear, substantially as described.

In testimony whereof I have hereunto signed my name.

GEORGE W. BORTON.

In presence of—
W. J. JACKSON,
K. M. GILLIGAN.